United States Patent
Li et al.

(10) Patent No.: US 12,522,692 B2
(45) Date of Patent: Jan. 13, 2026

(54) ANION-CONDUCTING POLYELECTROLYTES COMPRISING AMIDE GROUP, PREPARATION METHOD AND APPLICATION THEREOF

(71) Applicant: INSTITUTE OF COAL CHEMISTRY, CHINESE ACADEMY OF SCIENCES, Shanxi (CN)

(72) Inventors: Nanwen Li, Shanxi (CN); Xu Hu, Shanxi (CN); Yingda Huang, Shanxi (CN); Bin Hu, Shanxi (CN)

(73) Assignee: Ningbo Sino-Tech Hydrogen Membrane Technology Co., Ltd, Zhejiang (CN)

( * ) Notice: Subject to any disclaimer, the term of this patent is extended or adjusted under 35 U.S.C. 154(b) by 681 days.

(21) Appl. No.: 17/847,109

(22) Filed: Jun. 22, 2022

(65) Prior Publication Data
US 2022/0363811 A1    Nov. 17, 2022

Related U.S. Application Data

(63) Continuation-in-part of application No. PCT/CN2021/072809, filed on Jan. 20, 2021.

(30) Foreign Application Priority Data

Jan. 15, 2021   (CN) .......................... 202110055005.4

(51) Int. Cl.
| | |
|---|---|
| C08G 61/12 | (2006.01) |
| C08J 5/22 | (2006.01) |
| C25B 1/04 | (2021.01) |
| C25B 13/08 | (2006.01) |

(52) U.S. Cl.
CPC .......... *C08G 61/124* (2013.01); *C08J 5/2256* (2013.01); *C08J 5/2287* (2013.01); *C25B 1/04* (2013.01); *C25B 13/08* (2013.01); C08G 2261/124 (2013.01); C08G 2261/149 (2013.01); C08G 2261/312 (2013.01); C08J 2365/00 (2013.01)

(58) Field of Classification Search
CPC .... C08J 5/2256; C08J 5/2287; C08J 2365/00; C08G 61/214; C08G 2261/149; C08G 2261/312; C08G 2261/314; C25B 1/04
See application file for complete search history.

(56) References Cited

FOREIGN PATENT DOCUMENTS

| | | |
|---|---|---|
| CN | 109306151 A | 2/2019 |
| CN | 109880138 A | 6/2019 |
| CN | 110903449 A | 3/2020 |

OTHER PUBLICATIONS

Machine-generated English translation of Description of CN 110903449B, 23 pages, retrieved from Espacenet on Mar. 17, 2025. (Year: 2020).*

Hu Xu et al, Piperidinium functionalized aryl ether-free polyaromatics as anion exchange membrane for water electrolyses: performance and durability, Journal of Membrane Science, 19. Dec. 2020, vol. 621, pp. 1-12.

Li ZiQin et al, A Microporous Polymer With Suspended Cations for Anion Exchange Membrane Fuel Cells, Macromolecules, Sep. 12, 2020, vol. 53, pp. 10998-11008.

* cited by examiner

*Primary Examiner* — Fred M Teskin

(57) ABSTRACT

The present invention relates to the field of hydrogen energy, and more particularly to an anion-conducting polyelectrolyte comprising an amide group, a preparation method and application thereof. The method includes: polymerizing aromatic hydrocarbons and ketone comprising amide group by superacid catalysis, forming a membrane by a casting method, performing the membrane prepared under alkaline conditions to obtain theanion-conducting polyelectrolytes comprising amide group. Theanion-conducting polyelectrolytes obtained have good solubility and excellent stability. It is a kind of high molecular polymer with excellent alkali stability with an amide structure on the backbone. After alkaline treatment, the polymer not only has high hydroxide conductivity, good mechanical properties, and thermal stability but also has excellent alkali stability and excellent performance of water electrolysis.

10 Claims, 5 Drawing Sheets

ANION-CONDUCTING POLYELECTROLYTES COMPRISING AMIDE GROUP, PREPARATION METHOD AND APPLICATION THEREOF

CROSS REFERENCE TO RELATED APPLICATION

This is a Continuation-In-Part application of the International Application PCT/CN2021/072809, filed Jan. 20, 2021, which claims priority under 35 U.S.C. 119 (a-d) to CN 202110055005.4, filed Jan. 15, 2021.

BACKGROUND OF THE PRESENT INVENTION

Field of Invention

The present invention relates to the field of anion-conducting polyelectrolyte for hydrogen energy, and more particularly to an ion-solvating membrane comprising an amide group, a preparation method and application thereof.

Description of Related Arts

As a clean fuel for a sustainable society, hydrogen can be produced via water electrolysis by excess electrical energy from renewable sources (See Proc. IEEE, 2012, 100, 410). Proton exchange membranes electrolyzers (PEMELs) operate at high current densities and produce high-purity hydrogen, but rely on precious metals such as platinum and iridium oxide as catalysts (See Int. J. Hydrogen Energy, 2013, 38, 4901). On the other hand, the water-splittingreactioneasily occurs on platinum group metal (PGM)-free electrocatalystsin an alkaline environment, which is akeyaspect when considering industrial demands. Alkaline water electrolyzers are durable and robust systems and have been commercially available for many decades, but conventional systems suffer from high internal resistance.results in low efficiency (See *J. Electrochem. Soc.,* 2016, 163, F3197).

An effective way to achieve the purpose is to replace the porous diaphragm with an anion-conducting polyelectrolyte (ACPs), which allows the polyelectrolytes to directly contact the gas-diffusion layer in an electrode design, so the inter-electrode distance is less than 100 μm (See *Int. J. Hydrogen Energy,* 2011, 36,15089). In the past decade, anion-conducting polyelectrolytes based on quaternary ammonium functionalized polymers have recently received extensive attention (See *Journal of Membrane Science* 2021, 621, 118964), but improving the long-term stability of anion exchange parts in the polymer backbone as well as in the form of hydroxide ionomers remains a serious challenge, far from meeting the needs of industrialization (See *Energy Environ. Sci.,* 2014, 7, 3135). As a result, the traditional QA-based AEM still cannot provide chemical stability at high pH and/or high temperatures.

An alternative concept is to build electrolyzers around ion-solvating polymer electrolyte membrane systems (ISMs), combining the mechanical strength and gas tightness of polymers with the electrical conductivity of alkaline brine solutions (See *Energy Environ. Sci.,* 2019, 12, 3313-3318). It is generally made of a polymer with a hydrophilic group as the backbone, in which a strong alkaline electrolyte, such as KOH, NaOH or LiOH, and/or a plasticizer is incorporated. Therefore, ISMs have both the mechanical strength of polymers and the electrical conductivity of alkaline salts. Such polymer backbones usually contain strongly electronegative atoms, such as O, N, or S, etc., to enhance the interaction between the cations and polymer chains in doped alkaline electrolytes. Because of its superior thermal, mechanical, and chemical stability, ISM based on polybenzimidazoles (PBI) has been actively explored in alkaline water electrolyzers. Numerous strategies have been used to improve the properties of PBI-based membrane electrolyzers, including: (i) increasing the alkali stability of the PBI main chain by molecular designing (See *Journal of Materials Chemistry* A, 2017, 5, 5055-5066 and *Journal of Membrane Science,* 2022, 643, 12004); (ii) crosslinking of PBI by chemical treatment (See *Journal of Power Sources,* 2016, 312, 128-136); (iii) blending with another polymer to improve the properties (See *Journal of Membrane Science,* 2018, 564, 653-662); and (iv) tuning the porous structure to increase ion conductivity (See *Journal of Membrane Science,* 2015, 493, 589-598). Although the majority of those improvements resulted in improved PBI-based ISM performance, the problem remained in PBI backbones degradation via nucleophilic attack at the C2 position of benzimidazolide groups at long-term operation at high KOH concentration and high temperature. Thus, a challenge remains is the stable polymer backbone chemistries with enhanced electrolyte uptake.

SUMMARY OF THE PRESENT INVENTION

The invention discloses an anion-conducting polyelectrolytes with an amide-containing structure and excellent stability. It is a high molecular polymer with excellent alkali stability containing an amide structure on the backbone. After alkali treatment, the polymer not only has high hydroxide conductivity, good mechanical properties and thermal stability but also has excellent chemical stability and excellent performance of alkaline electrolyzers.

To achieve the above purpose, the technical solutions adopted in the present invention are as follows.

An anion-conducting polyelectrolytes comprising an amide group comprises: copolymers containing repeating structural units of:

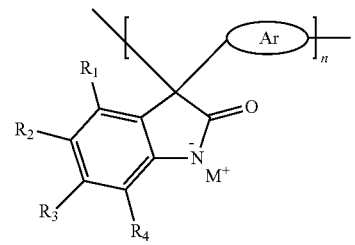

wherein Ar is a divalent organic group comprising an aromatic group; $R_1$, $R_2$, $R_3$, and $R_4$ is one member selected from the group consisting of:

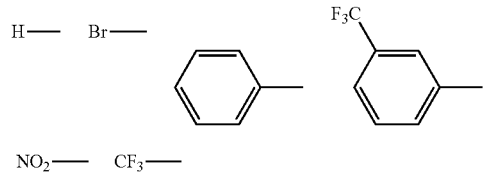

wherein:

M represents a metal salt, n represents a degree of polymerization; and hydroxide conductivity of theanion-conducting polyelectrolytes is greater than 10 mS/cm, and alkali stability thereof is more than 1000 hours.

Preferably, a number average molecular weight of theanion-conducting polyelectrolytes comprising the amide group is in a range of 5,000-800,000, and a polymerization degree n is a positive integer in a range of 10-200.

Preferably, the divalent organic group of Ar is at least one member selected from the group consisting of:

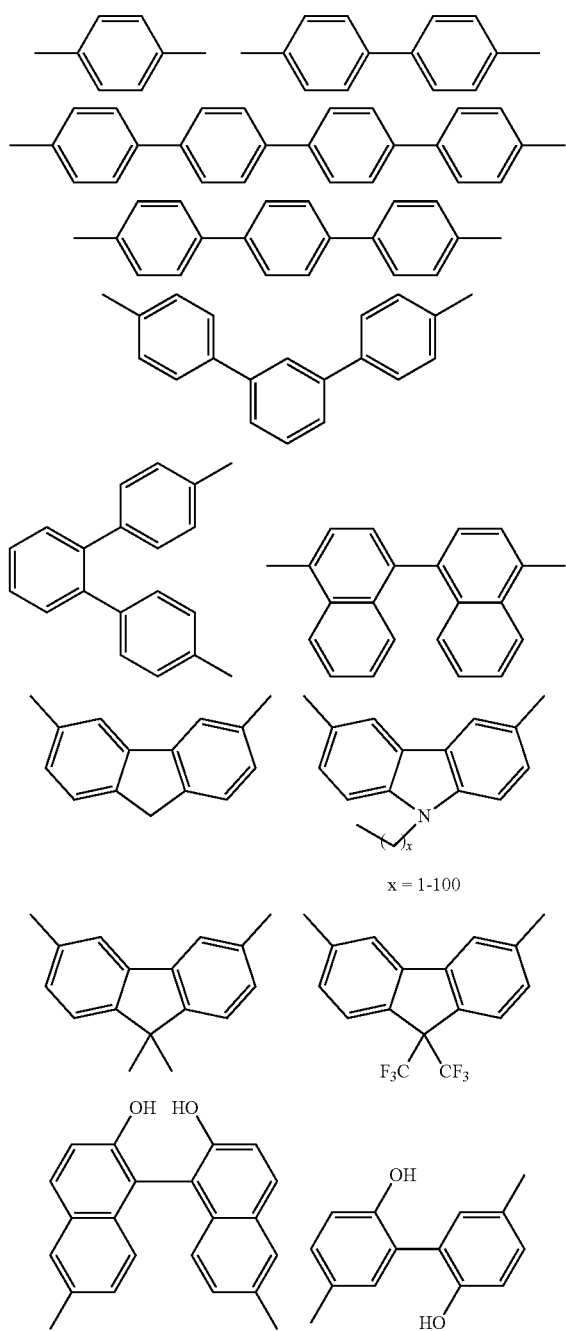

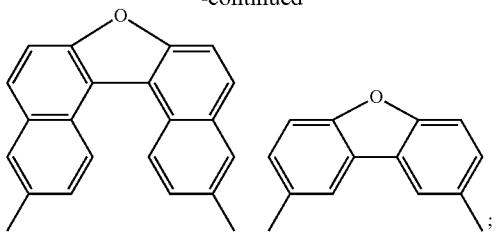

Preferably, the group comprising a benzene ring mentioned above has a certain rigidity and can increase the mechanical properties of the polymer.

Preferably, the metal salt of M is at least one member selected from the group consisting of Li, Na, K, Rb, and Cs.

Preferably, both a hydrogen permeation flux and oxygen permeation flux of theanion-conducting polyelectrolytes is less than 20 barrer; a decomposition temperature is higher than 400° C.; a glass transition temperature is higher than 200° C.; tensile strength is higher than 100 MPa, Young's modulus is higher than 200 MPa, and an elongation at break is higher than 5%; a change rate of a length, a width and a thickness is less than 200%; and the anion-conducting polyelectrolytepolymer is soluble in one or a mixture of at least two polar solvents selected from the group consisting of NMP (N-Methylpyrrolidone), DMF (N,N-Dimethylformamide), DMAc (N,N-Dimethylacetamide) and DMSO (Dimethyl sulfoxide).

A method for preparing the anion-conducting polyelectrolytes comprising the amide group comprises steps of polymerizing aromatic hydrocarbons and ketone comprising amide group by superacid catalysis, forming a membrane by a casting method, performing the membrane prepared under alkaline conditions to obtain theanion-conducting polyelectrolytes comprising amide group.

The method for preparing the anion-conducting polyelectrolytes specifically comprises steps of:

step (1): firstly dissolving an aromatic hydrocarbon containing an Ar group in methylene chloride to prepare a transparent solution, then adding the diketone monomer comprising an amide group, and also dissolving in the transparent solution;

step (2): adding trifluoromethanesulfonic acid (TFSA) and trifluoroacetic acid (TFA) drop by drop to the solution at 0° C. in step (1) to carry out reaction, after the reaction is finished, sending into methanol or ethanol to obtain a fibrous polymer; after carrying out precipitation washing for many times, adding potassium carbonate solution to remove the excess acid in the fibrous polymer, filtering and boiling the obtained fibrous solid polymer with water, filtering to obtain the polymer, and drying the obtained polymer;

step (3): dissolving the dried polymer in a polar solvent at a temperature in a range of 25-100° C., wherein a solid content of the solution is controlled in a range of 2-10 wt %; directly casting the polymer solution obtained on a glass plate or a stainless steel plate, flattening with a film casting knife, drying to form a film, and then vacuum dry to obtain a polymer film; and step (4): immersing the polymer membrane prepared in an alkaline solution for treatment to obtain theanion-conducting polyelectrolytes comprising the amide group.

Preferably, the alkali solution in step (4) is one or at least two mixing in a group consisting of potassium hydroxide, potassium carbonate, potassium bicarbonate, sodium hydroxide, sodium carbonate and sodium bicarbonate; and a concentration of the alkali solution is in a range of 1-15 mol/L, a treating time is in a range of 10-72 h, and a treatment temperature is in a range of 20-80° C.

Preferably, in step (1), a molar ratio of the Ar group-containing aromatic hydrocarbon to the diketone monomer containing the amide structure is in a range of 1:1-10; a final solid content of the solution is in a range of 10-20 wt %; a molar ratio of methanesulfonic acid and trifluoroacetic acid is in a range of 1:10-15, the reaction temperature is room temperature, the reaction time is in a range of 0.1-24 h, the drying is carried out in a vacuum drying oven, and a drying temperature is in a range of 60-150° C., and a drying time is in a range of 12-24 h.

Preferably, the polar solvent in step (3) is one or a mixture of at least two selected from the group consisting of NMP, DMF, DMAc, and DMSO; the temperature of drying to form a membrane is in a range of 60-100° C., and the time is in a range of 5-24 h; the temperature of vacuum drying is in a range of 80-150° C. for 1-24 h; the thickness of the polymer membrane obtained is in a range of 10-100 μm.

The present invention further provides an application of an anion-conducting polyelectrolytes comprising the amide group, and the anion-conducting polyelectrolytes comprising the amide group is applied to an alkaline electrolysis water device.

Compared with conventional arts, the present invention has advantages as follows.

(1) The present invention discloses theanion-conducting polyelectrolytes comprising the amide group, which is a polymer with an excellent alkali-stable backbone.

(2) The polymer prepared by the present invention has good solubility and film-forming properties and can be dissolved in one or at least two polar solvents of NMP, DMF, DMAc and DMSO at a room temperature.

(3) The hydroxide conductivity of the ion exchange membrane prepared by the present invention is greater than 10 mS/cm (20° C.), the electrolytic cell stability is greater than 500 h (75° C., 400 mA/cm$^2$), and the alkaline stability (8 M KOH, 80° C.)>10000 hours, the hydrogen and oxygen permeation flux is less than 20 barrer, the tensile strength is greater than 100 MPa, Young's modulus is greater than 200 MPa, and the elongation at break is greater than 5%; the change rate of length, width and thickness is less than 200%.

(4) The anion-conducting polyelectrolyte prepared by the present invention has good thermal stability and mechanical properties, the polymer decomposition temperature is higher than 400° C., and the glass transition temperature is higher than 200° C.

(5) The preparation method of theanion-conducting polyelectrolytes comprising the amide group of the present invention is simple, the cost is low, and it is easy to meet needs of industrialization.

(6) The present invention broadens the types and application range of membrane materials for alkaline water electrolyzer technology. Under 1.8V voltage, the current density is more than 1000 mA/cm$^2$, and the electrolyzed water runs stably for more than 2000 hours at 80° C. and 500 mA/cm$^2$.

DETAILED DESCRIPTION OF THE PREFERRED EMBODIMENT

Figure 1:
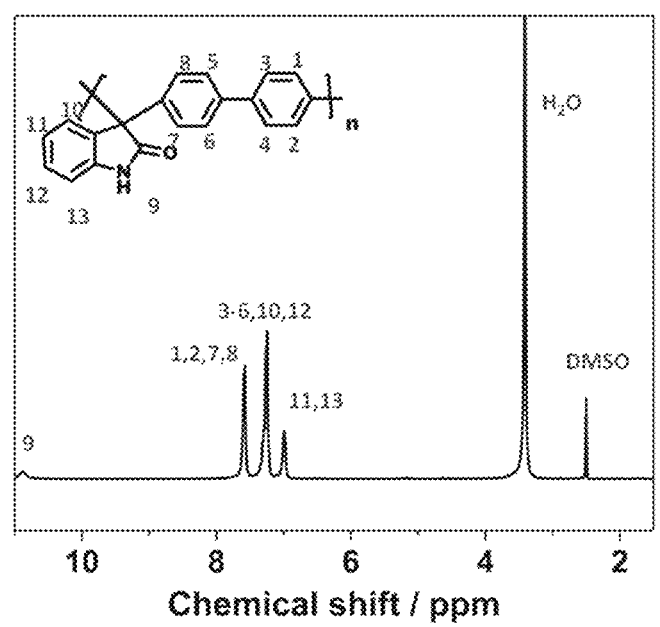
FIG. 1 is the $^1$HNMR spectrum of an anion-conducting polyelectrolytes comprising an amide group prepared in Example 1.

The technical solutions of the present invention will be described in detail below through specific embodiments, but these embodiments should be proposed for illustration, but are not construed as limiting the scope of the present invention.

Example 1

A method for preparing an anion-conducting polyelectrolytes comprising an amide group comprising following steps of:

step (1): at room temperature, first dissolving 0.15gbiphenyl in dichloromethane to prepare a transparent solution, then adding 0.16g isatin comprising amide group, and dissolving in the aforementioned transparent solution as well, wherein the molar ratio of the two monomers is 1:1.1, and the solid content of the solution is 18 wt %;

step (2): to the solution of step (1), adding trifluoromethanesulfonic acid (TFSA) and trifluoroacetic acid (TFA) dropwise at 0° C.; wherein the polymerization was initiated at 0° C. and then reacted at room temperature for 6 h; after the reaction was completed, the solution was poured into ethanol to obtain a fibrous polymer; after the fibrous polymer was washed several times by precipitation, the excess acid in the fibrous polymer was removed by adding potassium carbonate solution, and the obtained fibrous solid is filtered; the polymer was boiled with water, filtered, and the obtained polymer was dried in a vacuum drying oven at 60° C. for 24 h and weighed; the molar ratio of TFA and TFSA in the reaction system was 1:10.5.

step (3): dissolving the dried polymer in a polar solvent at 55° C., wherein the solid content of the solution was controlled at 8 wt %, and the obtained polymer solution was directly cast on a glass plate or stainless steel plate; using a casting knife Flattened, dried at 80° C. for 12 h to form a film, and then vacuum-drying at 80° C. for 24 h, the thickness of the film was between 10-100 μm.

step (4) immersing the polymer membrane prepared in 10 mol L$^{-1}$ alkaline solution at 80° C. for 72 h to obtain an amide structure-containing anion-conducting polyelectrolytes, and then storing theanion-conducting polyelectrolytes obtained after alkali treatment at room temperature.

The alkaline water electrolyzer was assembled using the prepared anion exchange membrane comprises the following steps of:

The specific steps are as follows: the anode was prepared by a catalyst-coated substrate (CCS) method. The anode catalyst was IrO$_2$, the cathode was a Pt/C titanium mesh, the nickel plate was a bipolar plate, and the effective area of the membrane was 5 cm². The membrane electrode was sandwiched between the cathode and the anode to assemble the water electrolysis device. A gold-plated porous Ti plate was used as the current collector in the cathode. Electrochemical tests were carried out in 10 mol $L^{-1}$ potassium hydroxide electrolyte at 75° C., polarization curves were obtained by measuring the cell voltages at different current densities, and evaluated at a constant current density of 400 mA·cm$^{-2}$ at 75° C. its durability. The current density was greater than 1000 mA/cm² at 2.0 V, and the electrolyzed water runs stably for more than 100 h at 80° C. and 400 mA/cm².

FIG. 1 is the $^1$H NMR spectrum of theanion-conducting polyelectrolytes comprising the amide group synthesized in this example, which proves its successful synthesis.

Figure 2:
FIG. 2 is a solubility test of theanion-conducting polyelectrolytes comprising the amide group prepared in Example 1.

FIG. 2 shows the experimental results of the solubility test of the amide structure-containing anion-conducting polyelectrolytes synthesized in this example. It can be seen that the amide structure-containing anion-conducting polyelectrolytes resoluble in NMP (N-Methylpyrrolidone), DMF (N,N-Dimethylformamide), DMAc (N,N-Dimethylacetamide), and DMSO (Dimethyl sulfoxide) polar solutions, which proves that it has good solubility properties, easy to prepare for industrialization.

Figure 4:
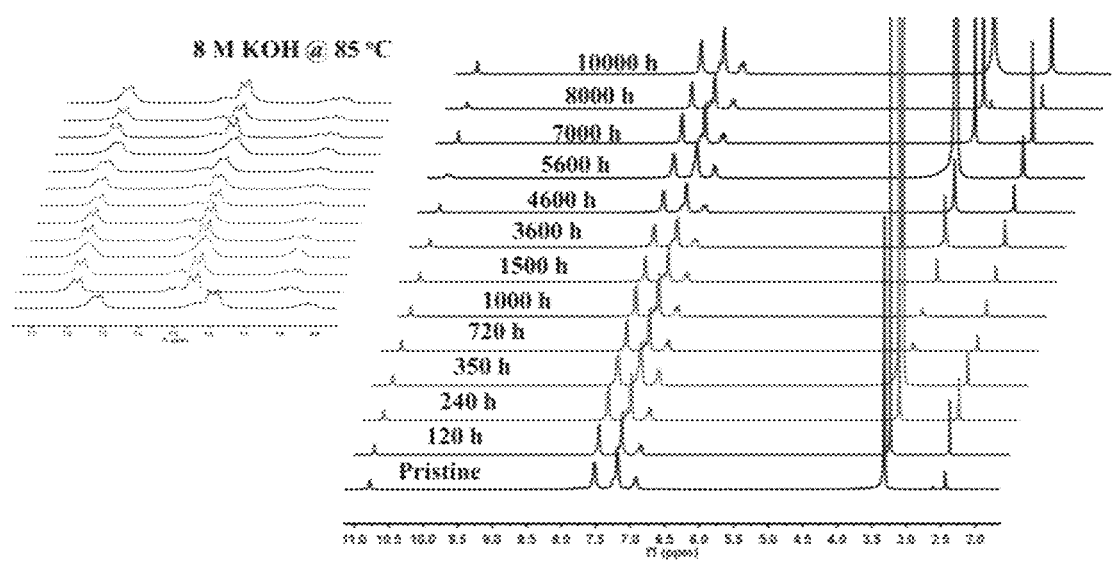
FIG. 4 shows the alkali stability of the anion-conducting polyelectrolytes comprising the amide group prepared in Example 1.

FIG. 4 shows the amide structure-containing anion-conducting polyelectrolyte synthesized in this example under extreme conditions (8 mol/L KOH, $^1$H NMR spectra at 80° C. for different times), which did not change after up to 10000 h, proving that it has excellent alkali stability.

Example 2

A preparation method of an anion-conducting polyelectrolytes comprising an amide group specifically comprises the following steps of:

Steps (1)-(3) are the same as in the Example 1.

step (4) the polymer membrane prepared was immersed in 80° C., 9 mol $L^{-1}$ alkaline solution for 72 h, and then performing electrochemically testing on the anion-conducting polyelectrolytes obtained after alkaline treatment in potassium hydroxide electrolyte with a concentration of 9 mol $L^{-1}$at 75° C. by alkaline electrolyzed water.

Example 3

A preparation method of an anion-conducting polyelectrolytes comprising an amide group specifically comprises the following steps:

Steps (1)-(3) are the same as in the Example 1.

step (4) the polymer membrane prepared was immersed in 80° C., 8 mol $L^{-1}$ alkaline solution for 72 h, and then performing electrochemically testing on the anion-conducting polyelectrolytes obtained after alkaline treatment in potassium hydroxide electrolyte with a concentration of 8 mol $L^{-1}$at 75° C. by alkaline electrolyzed water.

Example 4

A preparation method of an anion-conducting polyelectrolytes comprising an amide group, specifically comprises the following steps of:

Steps (1)-(3) are the same as in the Example 1.

step (4) the polymer membrane prepared was immersed in 80° C., 7 mol $L^{-1}$ alkaline solution for 72 h, and then performing electrochemically testing on the anion-conducting polyelectrolytes obtained after alkaline treatment in potassium hydroxide electrolyte with a concentration of 7 mol $L^{-1}$at 75° C. by alkaline electrolyzed water.

Example 5

A preparation method of an anion-conducting polyelectrolytes comprising an amide group, specifically comprises the following steps of:

Steps (1)-(3) are the same as in the Example 1.

step (4) the polymer membrane prepared was immersed in 80° C., 6 mol $L^{-1}$ alkaline solution for 72 h, and then performing electrochemically testing on the anion-conducting polyelectrolytes obtained after alkaline treatment in potassium hydroxide electrolyte with a concentration of 6 mol $L^{-1}$ at 75° C. by alkaline electrolyzed water.

Example 6

A preparation method of an anion-conducting polyelectrolytes comprising an amide group, specifically comprises the following steps of:

Steps (1)-(3) are the same as in the Example 1.

step (4) the polymer membrane prepared was immersed in 80° C., 5 mol $L^{-1}$ alkaline solution for 72 h, and then performing electrochemically testing on the anion-conducting polyelectrolytes obtained after alkaline treatment in potassium hydroxide electrolyte with a concentration of 5 mol $L^{-1}$ at 75° C. by alkaline electrolyzed water.

Example 7

A preparation method of an anion-conducting polyelectrolytes comprising an amide group, specifically comprises the following steps of:

Steps (1)-(3) are the same as in the Example 1.

step (4) the polymer membrane prepared was immersed in 80° C., 4 mol $L^{-1}$ alkaline solution for 72 h, and then performing electrochemically testing on the anion-conducting polyelectrolytes obtained after alkaline treatment in potassium hydroxide electrolyte with a concentration of 4 mol $L^{-1}$ at 75° C. by alkaline electrolyzed water.

Example 8

A preparation method of an anion-conducting polyelectrolytes comprising an amide group, specifically comprises the following steps of:

Steps (1)-(3) are the same as in the Example 1.

step (4) the polymer membrane prepared was immersed in 80° C., 3 mol $L^{-1}$ alkaline solution for 72 h, and then performing electrochemically testing on the anion-conducting polyelectrolytes obtained after alkaline treatment in potassium hydroxide electrolyte with a concentration of 3 mol $L^{-1}$ at 75° C. by alkaline electrolyzed water.

Example 9

A preparation method of an anion-conducting polyelectrolytes comprising an amide group, specifically comprises the following steps of:

Steps (1)-(3) are the same as in the Example 1.

step (4) the polymer membrane prepared was immersed in 80° C., 2 mol $L^{-1}$ alkaline solution for 72 h, and then performing electrochemically testing on the anion-conducting polyelectrolytes obtained after alkaline treatment in potassium hydroxide electrolyte with a concentration of 2 mol $L^{-1}$ at 75° C. by alkaline electrolyzed water.

Example 10

A preparation method of an anion-conducting polyelectrolytes comprising an amide group, specifically comprises the following steps of:

Steps (1)-(3) are the same as in the Example 1.

step (4) the polymer membrane prepared was immersed in 80° C., 1 mol $L^{-1}$ alkaline solution for 72 h, and then performing electrochemically testing on the anion-conducting polyelectrolytes obtained after alkaline treatment in potassium hydroxide electrolyte with a concentration of 1 mol $L^{-1}$ at 75° C. by alkaline electrolyzed water.

Example 11

A preparation method of an anion-conducting polyelectrolytes comprising an amide group, specifically comprises the following steps of:

Steps (1)-(3) are the same as in the Example 1.

step (4) the polymer membrane prepared was immersed in 80° C., 10 mol $L^{-1}$ alkaline solution for 48 h, and then performing electrochemically testing on the anion-conducting polyelectrolytes obtained after alkaline treatment in potassium hydroxide electrolyte with a concentration of 10 mol $L^{-1}$ at 75° C. by alkaline electrolyzed water.

Example 12

A preparation method of an anion-conducting polyelectrolytes comprising an amide group, specifically comprises the following steps of:

Steps (1)-(3) are the same as in the Example 1.

step (4) the polymer membrane prepared was immersed in 80° C., 9 mol $L^{-1}$ alkaline solution for 48 h, and then performing electrochemically testing on the anion-conducting polyelectrolytes obtained after alkaline treatment in potassium hydroxide electrolyte with a concentration of 9 mol $L^{-1}$ at 75° C. by alkaline electrolyzed water.

Example 13

A preparation method of an anion-conducting polyelectrolytes comprising an amide group, specifically comprises the following steps of:

Steps (1)-(3) are the same as in the Example 1.

step (4) the polymer membrane prepared was immersed in 80° C., 8 mol $L^{-1}$ alkaline solution for 48 h, and then performing electrochemically testing on the anion-conducting polyelectrolytes obtained after alkaline treatment in potassium hydroxide electrolyte with a concentration of 8 mol $L^{-1}$ at 75° C. by alkaline electrolyzed water.

Example 14

A preparation method of an anion-conducting polyelectrolytes comprising an amide group, specifically comprises the following steps of:

Steps (1)-(3) are the same as in the Example 1.

step (4) the polymer membrane prepared was immersed in 80° C., 7 mol $L^{-1}$ alkaline solution for 48 h, and then performing electrochemically testing on the anion-conducting polyelectrolytes obtained after alkaline treatment in potassium hydroxide electrolyte with a concentration of 7 mol $L^{-1}$ at 75° C. by alkaline electrolyzed water.

Example 15

A preparation method of an anion-conducting polyelectrolytes comprising an amide group, specifically comprises the following steps of:

Steps (1)-(3) are the same as in the Example 1.

step (4) the polymer membrane prepared was immersed in 80° C., 6 mol $L^{-1}$ alkaline solution for 48 h, and then performing electrochemically testing on the anion-conducting polyelectrolytes obtained after alkaline treatment in potassium hydroxide electrolyte with a concentration of 6 mol $L^{-1}$ at 75° C. by alkaline electrolyzed water.

Example 16

A preparation method of an anion-conducting polyelectrolytes comprising an amide group, specifically comprises the following steps of:

Steps (1)-(3) are the same as in the Example 1.

step (4) the polymer membrane prepared was immersed in 80° C., 5 mol $L^{-1}$ alkaline solution for 48 h, and then performing electrochemically testing on the anion-conducting polyelectrolytes obtained after alkaline treatment in potassium hydroxide electrolyte with a concentration of 5 mol $L^{-1}$ at 75° C. by alkaline electrolyzed water.

Example 17

A preparation method of an anion-conducting polyelectrolytes comprising an amide group, specifically comprises the following steps of:

Steps (1)-(3) are the same as in the Example 1.

step (4) the polymer membrane prepared was immersed in 80° C., 4 mol $L^{-1}$ alkaline solution for 48 h, and then performing electrochemically testing on the anion-conducting polyelectrolytes obtained after alkaline treatment in potassium hydroxide electrolyte with a concentration of 4 mol $L^{-1}$ at 75° C. by alkaline electrolyzed water.

Example 18

A preparation method of an anion-conducting polyelectrolytes comprising an amide group, specifically comprises the following steps of:
Steps (1)-(3) are the same as in the Example 1.
step (4) the polymer membrane prepared was immersed in 80° C., 3 mol $L^{-1}$ alkaline solution for 48 h, and then performing electrochemically testing on the anion-conducting polyelectrolytes obtained after alkaline treatment in potassium hydroxide electrolyte with a concentration of 3 mol $L^{-1}$ at 75° C. by alkaline electrolyzed water.

Example 19

A preparation method of an anion-conducting polyelectrolytes comprising an amide group, specifically comprises the following steps of:
Steps (1)-(3) are the same as in the Example 1.
step (4) the polymer membrane prepared was immersed in 80° C., 2 mol $L^{-1}$ alkaline solution for 48 h, and then performing electrochemically testing on the anion-conducting polyelectrolytes obtained after alkaline treatment in potassium hydroxide electrolyte with a concentration of 2 mol $L^{-1}$ at 75° C. by alkaline electrolyzed water.

Example 20

A preparation method of an anion-conducting polyelectrolytes comprising an amide group, specifically comprises the following steps of:
Steps (1)-(3) are the same as in the Example 1.
step (4) the polymer membrane prepared was immersed in 80° C., 1 mol $L^{-1}$ alkaline solution for 48 h, and then performing electrochemically testing on the anion-conducting polyelectrolytes obtained after alkaline treatment in potassium hydroxide electrolyte with a concentration of 1 mol $L^{-1}$ at 75° C. by alkaline electrolyzed water.

Contrast Example

A preparation method of an anion-conducting polyelectrolytes comprising an amide group, specifically comprises the following steps of:
Steps (1)-(3) are the same as in the Example 1.
step (4) the polymer membrane prepared was immersed in 80° C., in deionized water for 72 h, and then performing electrochemically testing on the anion-conducting polyelectrolytes obtained after alkaline treatment in potassium hydroxide electrolyte with a concentration of 1 mol $L^{-1}$ at 75° C. by alkaline electrolyzed water.

Figure 3:
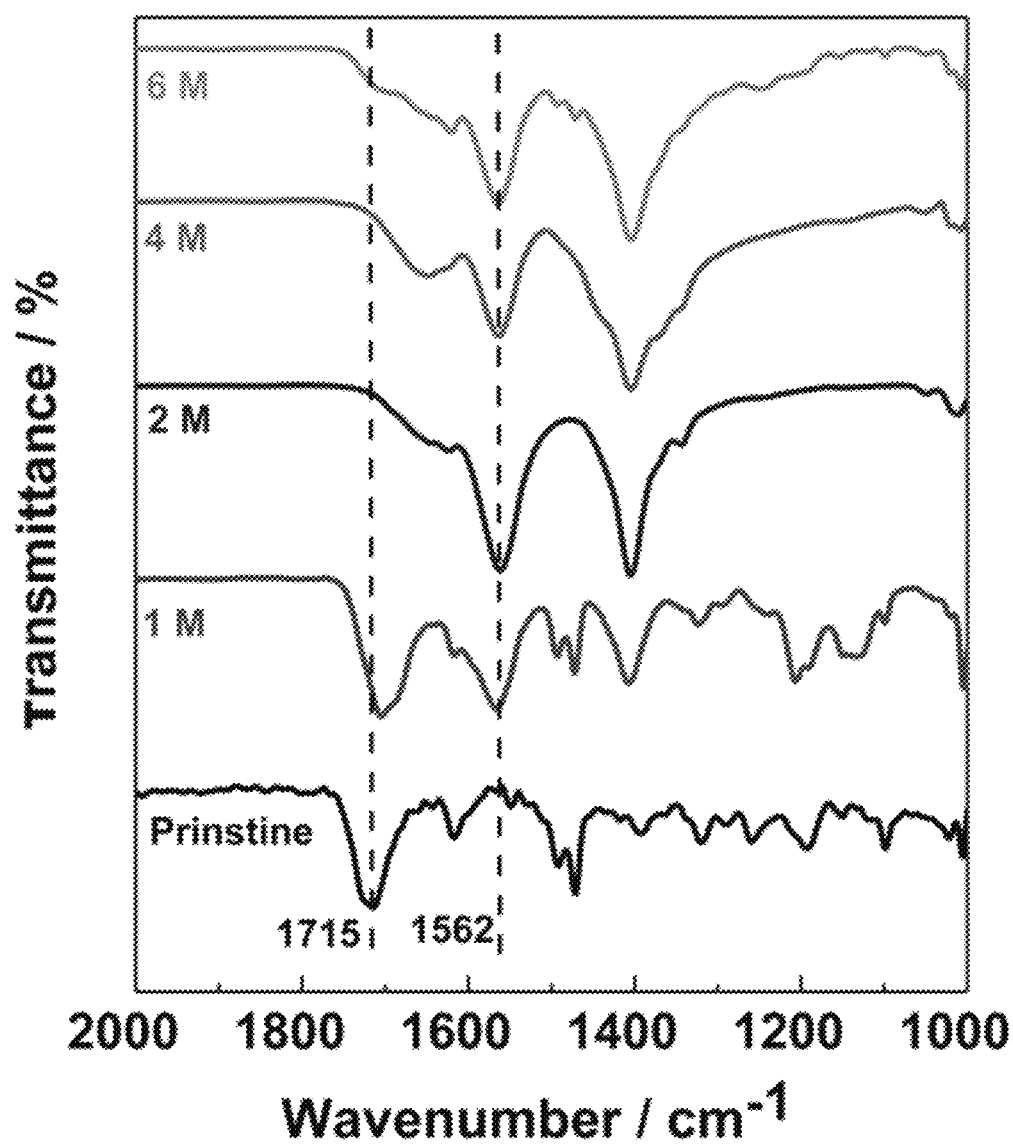
FIG. 3 is the ATR-FTIR of the anion-conducting polyelectrolytes comprising the amide group prepared in Examples 5, 7, 9, 10 and the comparative example.

FIG. 3 is the ATR infrared spectra of the amide structure-containing anion-conducting polyelectrolytes prepared in Examples 5, 7, 9, 10 and the Contrast example after being treated with alkaline solutions of different concentrations, and the structure of the polymer is confirmed by comparison.

Figure 5:
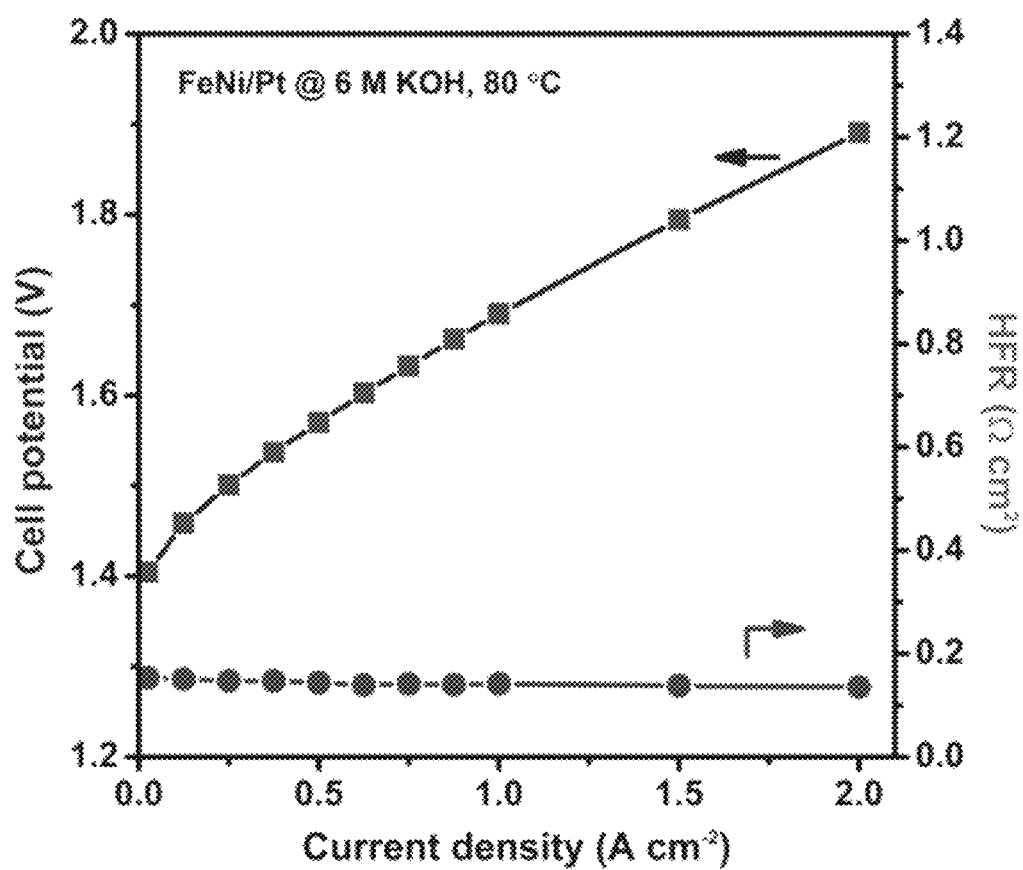
FIG. 5 shows the polarization curves of theanion-conducting polyelectrolytes comprising the amide group prepared in Examples 5 on an alkaline water electrolysis device.

FIG. 5 is the initial performance of the amide structure-containing anion-conducting polyelectrolytes prepared in Examples 5 of the present invention on an alkaline water electrolysis device, indicating that their resistance is low and has good application prospects for electrolyzed water One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described to illustrate the functional and structural principles of the present invention and are subject to change without departure from such principles. Therefore, this invention includes all modifications encompassed within the spirit and scope of the following claims.

What is claimed is:
1. An anion-conducting polyelectrolytes comprising amide group, comprising: copolymers containing repeating structural units of:

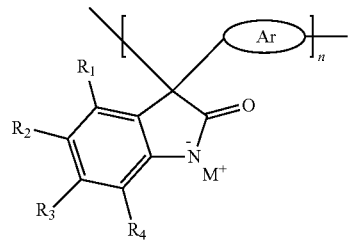

wherein Ar is a divalent organic group comprising an aromatic group; $R_1$, $R_2$, $R_3$ and $R_4$ is one member selected from the group consisting of:

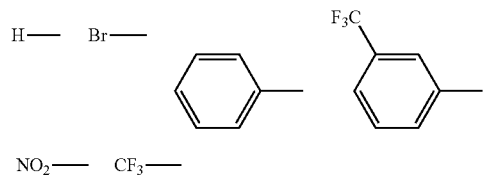

wherein:
M represents a metal salt, and n represents a degree of polymerization; and
hydroxide conductivity of the anion-conducting polyelectrolytes is greater than 10 mS/cm, and alkali stability thereof is more than 1000 hours.

2. The anion-conducting polyelectrolytes comprising amide group, as recited in claim 1, wherein a number average molecular weight of the anion-conducting polyelectrolytes comprising amide group is in a range of 5,000-800,000, and a polymerization degree n is a positive integer in a range of 10-200.

3. The anion-conducting polyelectrolytes comprising amide group, as recited in claim 1, wherein:
the divalent organic group of Ar is at least one member selected from the group consisting of:

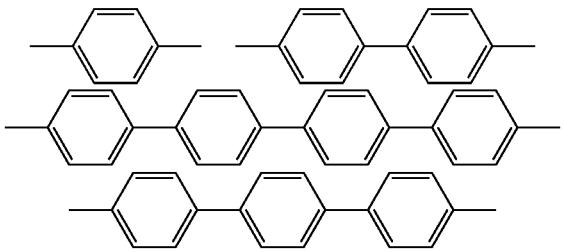

-continued

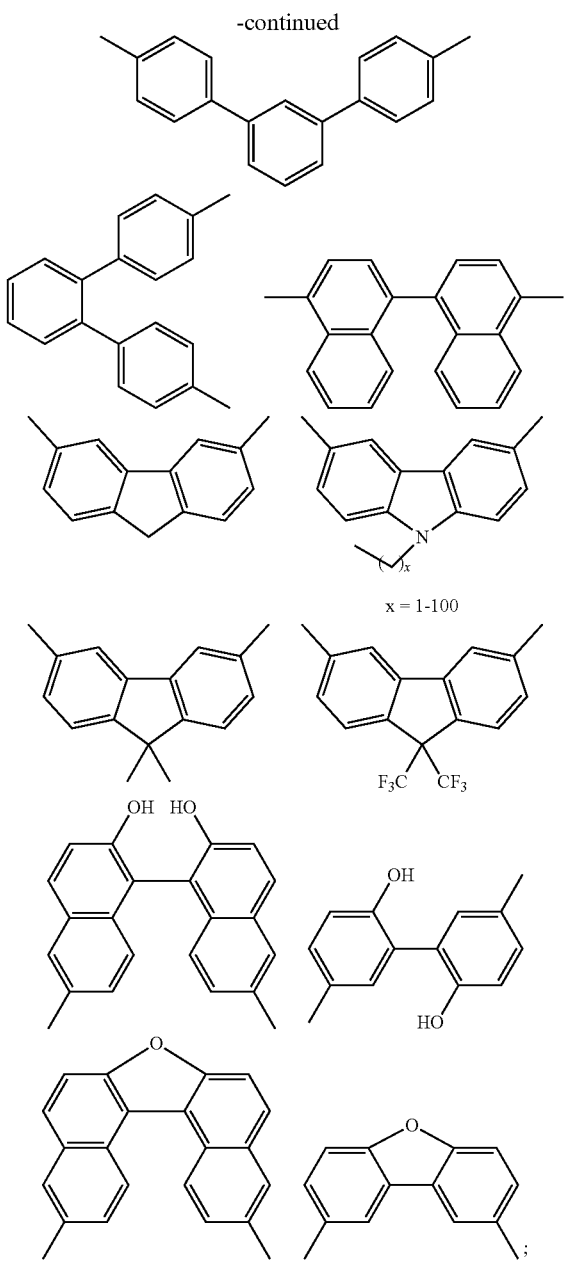

x = 1-100 and
the metal salt of M is at least one member selected from the group consisting of: Li, Na, K, Rb and Cs.

4. The anion-conducting polyelectrolytes comprising amide group, as recited in claim 1, wherein:
both a hydrogen permeation flux and an and oxygen permeation flux of theanion-conducting polyelectrolytes is less than 20 barrer;
a decomposition temperature is higher than 400° C.;
a glass transition temperature is higher than 200° C.;
a tensile strength is higher than 100 MPa, the Young's modulus is higher than 200 MPa, and an elongation at break is higher than 5%;
a change rate of a length, a width and a thickness is less than 200%; and
the anion-conducting polyelectrolytes are soluble in one or a mixture of at least two polar solvents selected from a group consisting of NMP (N-Methylpyrrolidone), DMF (N,N-Dimethylformamide), DMAc (N,N-Dimethylacetamide) and DMSO (Dimethyl sulfoxide).

5. A method for preparing the anion-conducting polyelectrolytes comprising the amide group, as recited in claim 1, comprising steps of: polymerizing aromatic hydrocarbons and ketone comprising amide group by superacid catalysis, forming a membrane by a casting method, performing the membrane prepared under alkaline conditions to obtain the anion-conducting polyelectrolytes comprising amide group.

6. The method for preparing the anion-conducting polyelectrolytes, as recited in claim 4, specifically comprises steps of:
step (1): firstly dissolving an aromatic hydrocarbon containing an Ar group in methylene chloride to prepare a solution, then adding a diketone monomer comprising an amide group, and also dissolving in the solution;
step (2): adding trifluoromethanesulfonic acid (TFSA) and trifluoroacetic acid (TFA) drop by drop to the solution at 0° C. in step (1) to carry out reaction, after the reaction is finished, sending into methanol or ethanol to obtain a fibrous polymer; after carrying out precipitation washing for many times, adding potassium carbonate solution to remove the excess acid in the fibrous polymer, filtering and boiling the obtained fibrous solid polymer with water, filtering to obtain the polymer, and drying the obtained polymer;
step (3): dissolving the dried polymer in a polar solvent at a temperature in a range of 25-100° C., wherein a solid content of the solution is controlled in a range of 2-10 wt %; directly casting the polymer solution obtained on a glass plate or a stainless steel plate, flattening with a film casting knife, drying to form a film, and then vacuum dry to obtain a polymer film; and
step (4): immersing the polymer membrane prepared in an alkaline solution for treatment to obtain the anion-conducting polyelectrolytes comprising the amide group.

7. The method for preparing the anion-conducting polyelectrolytes, as recited in claim 6, wherein the alkali solution in the step (4) is one or at least two mixing in a group consisting of potassium hydroxide, potassium carbonate, potassium bicarbonate, sodium hydroxide, sodium carbonate and sodium bicarbonate; and a concentration of the alkali solution is in a range of 1-15 mol/L, a treating time is in a range of 10-72 h, and a treatment temperature is in a range of 20-80° C.

8. The method for preparing the anion-conducting polyelectrolytes, as recited in claim 6, in the step (1), a molar ratio of the Ar group-containing aromatic hydrocarbon to the group containing the amide structure is in a range of 1:1-10; a final solid content of the solution is in a range of 10-20 wt %; a molar ratio of the trifluoromethanesulfonic acid (TFSA) and the trifluoroacetic acid (TFA) is in a range of 1:10-15, the reaction temperature is room temperature, the reaction time is in a range of 0.1-24 h, the drying is carried out in a vacuum drying oven, and a drying temperature is in a range of 60-150° C., and a drying time is in a range of 12-24 h.

9. The method for preparing the anion-conducting polyelectrolytes, as recited in claim 6, wherein the polar solvent in the step (3) is one or a mixture of at least two selected from the group consisting of NMP, DMF, DMAc, and DMSO; the temperature of drying to form a membrane is in a range of 60-100° C., and the time is in a range of 5-24 h; the temperature of vacuum drying is in a range of 80-150° C. for 1-24 h; the thickness of the polymer membrane obtained is in a range of 10-100 μm.

10. A method for preparing alkaline water electrolysis device, comprising introducing the anion-conducting polyelectrolytes comprising the amide group as recited in claim 1.

* * * * *